(12) United States Patent  
Takahashi

(10) Patent No.: US 8,395,126 B2  
(45) Date of Patent: Mar. 12, 2013

(54) X-RAY IMAGING APPARATUS, X-RAY IMAGING METHOD, AND COMPUTER STORAGE MEDIUM

(75) Inventor: Naoto Takahashi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 13/186,287

(22) Filed: Jul. 19, 2011

(65) Prior Publication Data

US 2012/0018646 A1 Jan. 26, 2012

(30) Foreign Application Priority Data

Jul. 23, 2010 (JP) ................................. 2010-166137

(51) Int. Cl.  
*G01T 1/24* (2006.01)

(52) U.S. Cl. ................. 250/370.09; 250/371; 250/252.1

(58) Field of Classification Search .............. 250/370.09  
See application file for complete search history.

(56) References Cited

U.S. PATENT DOCUMENTS

| 5,878,108 | A | * | 3/1999 | Baba et al. ................... 378/98.4 |
| 5,960,058 | A | * | 9/1999 | Baba et al. ................... 378/98.4 |
| 6,618,084 | B1 | * | 9/2003 | Rambaldi et al. ............. 348/247 |
| 6,828,539 | B1 | * | 12/2004 | Kuwabara .................. 250/208.1 |
| 7,120,230 | B2 | * | 10/2006 | Petrick et al. ................ 378/98.8 |
| 7,382,853 | B2 | * | 6/2008 | Arenson et al. ................. 378/19 |
| 2006/0104496 | A1 | * | 5/2006 | Arenson et al. ............... 382/132 |
| 2008/0217545 | A1 | * | 9/2008 | Liu et al. .................. 250/370.09 |

FOREIGN PATENT DOCUMENTS

JP  01-235484 A  9/1989

\* cited by examiner

*Primary Examiner* — Marcus Taningco  
(74) *Attorney, Agent, or Firm* — Canon U.S.A., Inc. IP Division

(57) ABSTRACT

An X-ray imaging apparatus includes an image capture unit including a plurality of pixels for imaging X-ray radiation, a first correction unit configured to correct an output value of an unsaturated pixel among the plurality of pixels, and a second correction unit configured to correct an output value of a saturated pixel among the plurality of pixels. The second correction unit corrects the saturated pixel based on an output value of the unsaturated pixel corrected by the first correction unit and located within a predetermined distance from the saturated pixel.

9 Claims, 12 Drawing Sheets

X-RAY IMAGING APPARATUS, X-RAY IMAGING METHOD, AND COMPUTER STORAGE MEDIUM

BACKGROUND OF THE INVENTION

1. Field of the Invention

The present invention relates to an X-ray imaging apparatus and an X-ray imaging method capable of correcting a variation in input/output characteristics of each pixel used in X-ray imaging.

2. Description of the Related Art

In recent years, as medical X-ray imaging apparatuses, digital X-ray imaging apparatuses employing various methods have been becoming widespread, with the advancement of the digital technology. For example, one technique in current practical use is the method of using an X-ray detector in which a phosphor and a large-area amorphous silicon (a-Si) sensor are in close contact with each other to enable a direct digital conversion of an X-ray image without, for example, an optical system. Another technique in current practical use is the method of using, for example, amorphous selenium (a-Se) to directly photoelectrically convert an X-ray into electrons which are detected by a large area amorphous silicon sensor.

In X-ray imaging apparatuses with use of the above-mentioned X-ray detectors, it is generally practiced to correct a variation in sensitivities in every photoelectric conversion element and a difference among input/output characteristics (relationships between an incident X-ray dose and an output value) in every pixel due to, for example, a variation in gains in readout circuits.

For example, if input/output characteristics of individual pixels are guaranteed to be linear, corrections thereof can be achieved by acquiring correction data by projecting an X-ray of a predetermined intensity to the whole surface of a detector without a subject, and dividing a captured image of a subject by this correction data (or subtracting the correction data from the image of the subject after a logarithmic conversion).

However, the input/output characteristic of a standard X-ray detector is known to show nonlinearity when a large incident X-ray dose is projected thereto, since the linearity cannot be maintained due to a saturation phenomenon. Therefore, in such a case, the above-described correction method based on an assumption of linearity cannot provide an appropriate correction to a nonlinear dose region. With the aim of solving this problem, Japanese Patent Application Laid-Open No. 01-235484 discusses a method for correcting such a nonlinear characteristic.

According to this method, a nonlinear characteristic can be appropriately corrected by storing parameters in advance in which the input/output characteristic of each pixel is approximated by a predetermined model function, and using an inverse function of the model function.

However, the method discussed in Japanese Patent Application Laid-Open No. 01-235484 takes into consideration a dose region where the input/output characteristic of each pixel becomes nonlinear, but fails to address a dose region where an output is saturated, i.e., a dose region where an incident X-ray dose that enters a pixel exceeds the acceptable charging amount of that pixel so that the pixel outputs a substantially constant value (hereinafter, this value is referred to as "saturation level"). Once an output reaches the saturation level, a significant change does not occur in the output value relative to an incident X-ray dose to a pixel, so that it is difficult to detect a value of incident X-ray dose from the output value of the pixel. Therefore, the input/output characteristic thereof may not be able to be corrected appropriately.

More specifically, in a dose region where a pixel outputs a substantially constant value, the inverse function cannot produce a unique solution, whereby an appropriate correction is impossible. Further, when the input/output characteristic of each pixel is approximated by a predetermined model function, inclusion of data indicating an output value that reaches the saturation level lowers the approximation accuracy, as a result of which an appropriate correction may be impossible.

On the other hand, it is possible to limit a maximum incident X-ray dose so as to prevent an output value from reaching the saturation level. However, each pixel has a different dose region where the output is saturated, and therefore there are more than a few pixels which the output value reaches the saturation level with a smaller dose compared to other pixels. Then, a problem arises in that, if the maximum incident X-ray dose is limited within such a range that all pixels are prevented from reaching their saturation levels, this results in narrowing of a photographable dose region (dynamic range).

SUMMARY OF THE INVENTION

The present invention is directed to correcting a variation in input/output characteristics, even if there is a pixel having a saturated output.

According to an aspect of the present invention, an X-ray imaging apparatus includes an image capture unit including a plurality of pixels for imaging X-ray radiation, a first correction unit configured to correct an output value of an unsaturated pixel among the plurality of pixels, and a second correction unit configured to correct an output value of a saturated pixel among the plurality of pixels. The second correction unit corrects the saturated pixel based on an output value of the unsaturated pixel corrected by the first correction unit and located within a predetermined distance from the saturated pixel.

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
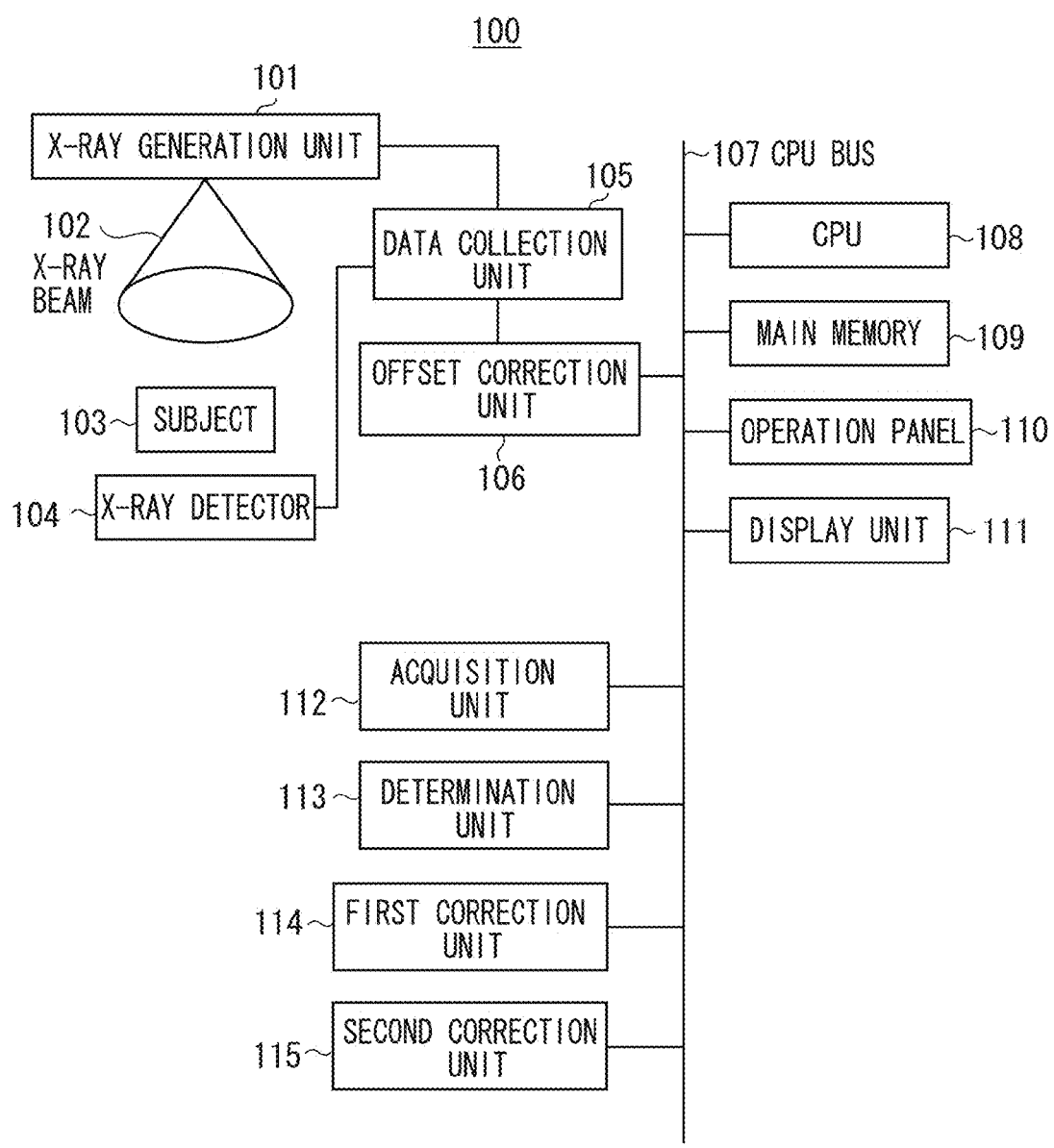
FIG. 1 illustrates an overall configuration of an X-ray imaging apparatus according to a first exemplary embodiment.

A first exemplary embodiment will be now described. The present exemplary embodiment is applied to, for example, an X-ray imaging apparatus 100 as illustrated in FIG. 1. As illustrated in FIG. 1, the X-ray imaging system 100 has functions of irradiating a subject 103 with X-ray radiation, and outputting the acquired captured image onto a film, a digital sensor or a monitor.

The X-ray imaging apparatus 100 includes an X-ray generation unit 101 configured to generate X-ray radiation, and an X-ray detector 104. The X-ray detector 104 is referred herein as an image capture unit, which is configured to capture the X-ray radiation generated by the X-ray generation unit 101 and to convert the radiation into an image signal by a plurality of pixels. A data collection unit 105 is configured to collect (e.g., temporarily store) image data captured by the X-ray detector 104. Further, the X-ray imaging apparatus 100 includes an offset correction unit 106 configured to correct an offset of the image data collected by the data collection unit 105. The foregoing elements and others constituting the X-ray imaging apparatus are controlled according to an input to an operation panel 110 under control of a central processing unit (CPU) 108, such as a microprocessor. The thus processed (offset corrected) image data is displayed on a display unit 111.

The X-ray imaging apparatus 100 further includes an acquisition unit 112 configured to acquire a saturation level of each pixel among a plurality of pixels, and to approximate the relationship between an input X-ray and an output value of each pixel as an input/output characteristic. A determination unit 113 is configured to determine whether an output value reaches the saturation level for each pixel.

The X-ray imaging apparatus 100 further includes a first correction unit 114 and a second correction unit 115 both configured to correct output values of individual pixels out of the plurality of pixels. Specifically, the first correction unit 114 is configured to correct an output value of a given pixel, of which the output value is not saturated. The second correction unit 115 is configured to correct an output value of a pixel, of which the output value is saturated. In other words, the first correction unit 114 can correct a pixel having no saturation level (unsaturated pixel); and the second correction unit 115 can correct a pixel having a saturation level (saturated pixel), among a plurality of pixels. The second correction unit 115 corrects the pixel having a saturation level based on the output value of the pixel corrected by the first correction unit 114. The acquisition unit 112, the determination unit 113, the first correction unit 114 and the second correction unit 115 are connected via a CPU bus 107 in such a manner that they can receive and transmit data to each other, and are controlled by the CPU 108.

In the X-ray imaging apparatus 100, a main memory 109 functions as a main repository (storage) of various kinds of data (e.g. processing programs and operating system) required for operating (running) the CPU 108. The main memory 109 may also serve as a working memory of the CPU 108. The CPU 108 controls operations of the entire apparatus with use of the main memory 109 according to a user's operation from the operation panel 110.

It should be understood that, in the present invention, an embodiment may be achieved by directly or remotely providing to the CPU 108 a software program or programs via, for example, a network. In the exemplary embodiments, the flowcharts illustrated in the drawings may be implemented in hardware, such as field programmable gate array (FPGA) modules, software programs, or a combination of both for realizing the functions of the exemplary embodiments. As will be described later, the flowcharts may be preferably implemented by causing the CPU 108 to read and execute the provided program code(s).

In such a case, an embodiment of the present invention can be a program code(s) itself either installed in the main memory, or stored in a non-transitory computer-readable medium for enabling the computer to realize the functions and processes according to the present invention. In other words, a physical storage medium either local to a computer or remote thereto storing a computer program(s) for enabling the computer to realize the functions and processing according to the present invention is included as being within the scope of the present invention.

Examples of a computer storage medium for providing such a program(s) include a hard disk, an optical disc, a magneto-optical disc (MO), a compact disc read only memory (CD-ROM), a compact disc recordable (CD-R), a compact disc re-writeable (CD-RW), a magnetic tape, a non-volatile memory card, a read only memory (ROM), and a digital versatile disc (DVD) (digital versatile disc read only memory (DVD-ROM) and digital versatile disc recordable (DVD-R)).

In the X-ray detector 104, each pixel performs a photoelectric conversion according to a two-dimensional intensity distribution of X-ray radiation emitted by the X-ray generation unit 101, whereby the X-ray detector 104 generates an analog image signal. The data collection unit 105 converts the analog image signal acquired by the X-ray detector 104 into a digital image signal, and supplies it to the offset correction unit 106. The offset correction unit 106 corrects an offset variation by subtracting an offset unique to each pixel, which is acquired without an X-ray emitted thereto, from the digital image signal. The digital image signal with its offset variation corrected is first stored in the main memory 109 through the CPU bus 107 as X-ray image data. This X-ray image data is then supplied to the respective circuits according to control of the CPU 108.

Operations characteristic of the present exemplary embodiment in the X-ray imaging apparatus 100 configured as described above are an operation of calculating the input/output characteristic and the saturation level of each pixel (hereinafter referred to as "calibration operation"), and an operation of correcting a variation in the input/output characteristics from a captured image of a subject (hereinafter referred to as "imaging operation"), which will be described below, respectively.

<Calibration Operation>

Figure 2:
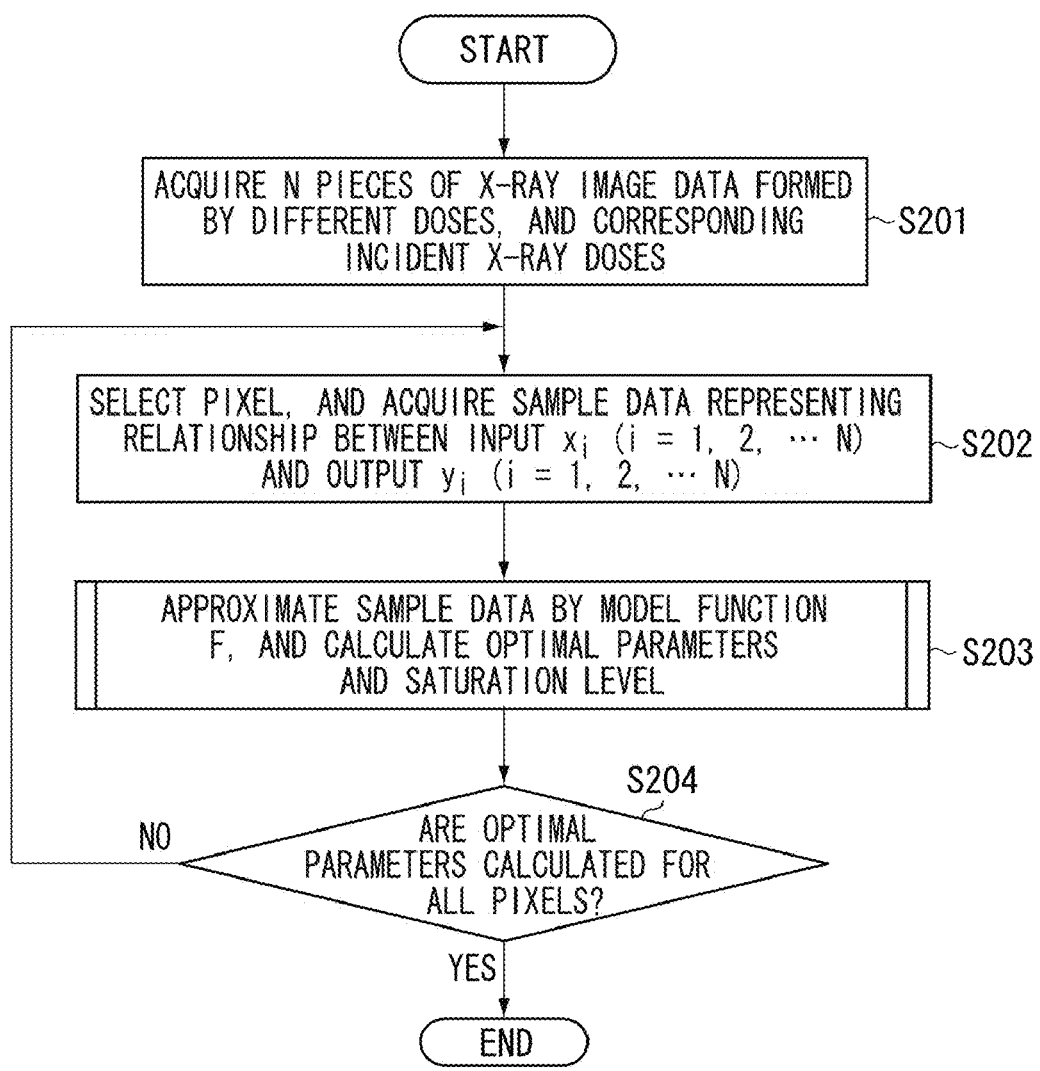
FIG. 2 is a flowchart illustrating a processing procedure of a calibration operation according to the first exemplary embodiment.
Figure 8:
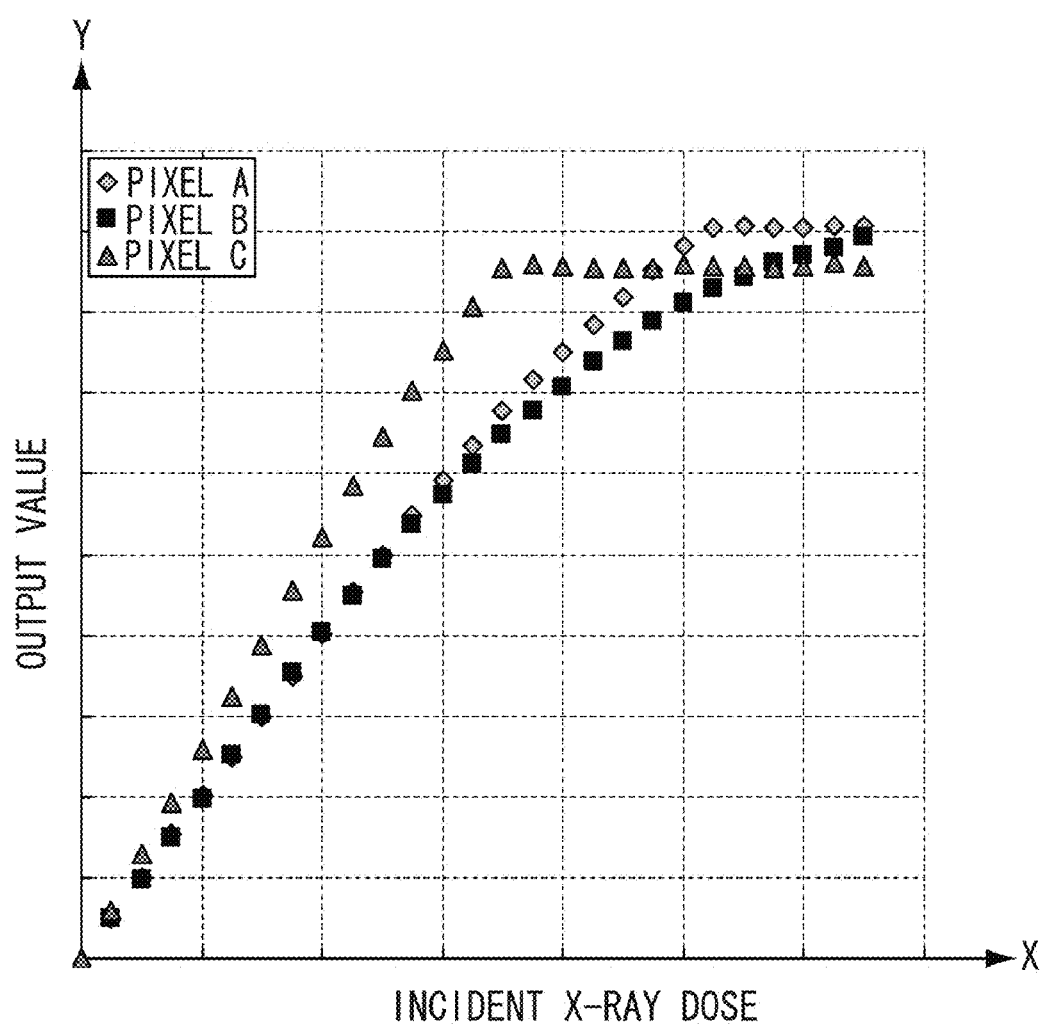
FIG. 8 illustrates an input/output characteristic of each pixel.

The calibration operation according to the first exemplary embodiment will be now described. The calibration operation of the X-ray imaging apparatus 100 illustrated in FIG. 1 will be specifically described with reference to the flowcharts illustrated in FIGS. 2 and 3. First, an operator performs the calibration operation, by imaging without a subject 103. During the calibration operation the user a series of predetermined input command through the operation panel 110. In the calibration operation, imaging is performed a plurality of times (e.g., "N" times) while changing the intensity of an X-ray beam 102 emitted from the X-ray generation unit 101 according to the control of the CPU 108. At the same time, an incident X-ray dose (intensity) for each imaging is measured by a not-illustrated dosimeter. In step S201, this imaged data (calibration imaging data) is first stored in the main memory 109 together with the measured incident X-ray dose as X-ray image data (step S201), after an offset variation is corrected in the imaged data as described above. This recorded data can be used as sample data indicating the input/output characteristic of each pixel by setting the incident X-ray dose to the X axis and setting the output value of that pixel in the X-ray image corresponding to the incident X-ray dose to the Y axis, as illustrated in FIG. 8. The present exemplary embodiment is configured in such a manner that the incident X-ray dose is measured by a dosimeter, but is not limited thereto. The incident X-ray dose may be estimated from imaging conditions and X-ray image data.

Next, the acquisition unit 112 performs steps S202 to S204, thereby calculating and acquiring parameters in which the input/output characteristic is approximated and the saturation level for each pixel is determined. Calculating the saturation level means acquisition of a value at which an output value of a pixel starts to be saturated.

As described above, the term "saturation level" is used to refer to a dose region where an output is saturated, i.e., a dose region where an incident X-ray dose that enters a pixel exceeds the acceptable charging amount of that pixel so that the output value thereof becomes a substantially constant value. Further, the term "pixel which the output value is saturated" is used to refer to a pixel, the output value of which reaches the saturation level. The term "pixel which the output value is unsaturated" is used to refer to a pixel, the output value of which does not reach the saturation level.

First, in step S202, the acquisition unit 112 acquires the incident X-ray doses $\{x_i | i=1, 2 \ldots N, \text{ and } x_i < x_{i+1}\}$ and the output values $\{y_i | i=1, 2 \ldots N\}$ for an arbitrary pixel. The acquired incident X-ray doses $x_i$ and output values $y_i$ are stored in the main memory 109, as the sample data indicating the input/output characteristic of that pixel. Here, "$x_i$" represents the $i^{th}$ incident X-ray dose and "$y_i$" represents the corresponding $i^{th}$ output value of an arbitrary pixel irradiated during the calibration operation a plurality of N times (i=1, 2, ... N).

Next, in step S203, the acquisition unit 112 calculates parameters for approximating the input/output characteristic of the pixel by a function model F based on the acquired sample data, and the saturation level of the pixel to store them in the main memory 109.

Then, in step S204, the acquisition unit 112 repeats the operations of steps S202 and S203 for all pixels to calculate the parameters and the saturation levels of the all pixels, and then ends the calibration operation. When an incident X-ray dose projected to a pixel exceeds the acceptable charging amount of that pixel, the output value thereof becomes a substantially constant value as described above, and this constant value is acquired as the saturation level of the pixel.

More specifically, the present exemplary embodiment uses, for example, a composite function expressed by the following equation as the function model F.

[EQUATION 1]

$$F(x) = \begin{cases} Ax & x < T_0 \\ B(x-T_0)^2 + C(x-T_0) + AT_0 & T_0 \le x \le T_1 \\ B(T_1-T_0)^2 + C(T_1-T_0) + AT_0 & x > T_1 \end{cases} \quad (1)$$

In this equation, when x ("x" being the above-describe incident X-ray dose) is less than a minimum (first) threshold $T_0$, a linear expression is used to model a dose region having a linear input/output characteristic. When x is within the range of the minimum (first) threshold $T_0$ and a maximum (second) threshold $T_1$, a quadratic expression is used to model a dose region having a nonlinear input/output characteristic. Further, when x exceeds the maximum (second) threshold $T_1$, a constant value is set to model a dose region where an output reaches a saturation level. It should be noted that, for simplicity the function model F has been defined as having only three ranges (i.e., below a first threshold, within the first and second threshold, and above a second threshold). However, any number of ranges may be established in the function model F based on predetermined values of the incident X-ray dose or pixel output values.

In equation (1) A, B, C, $T_0$, and $T_1$ are unknown parameters, and they can be determined by acquiring parameters appropriately approximating the acquired sample data. The above equation can be solved according to the least squares criterion in a linear algebraic manner, once the threshold values $T_0$ and $T_1$ are fixed. Further, a saturation level S can be calculated from the acquired parameters. The calculation method therefor will be described more concretely with reference to the flowchart illustrated in FIG. 3.

First, in step S301, the acquisition unit 112 sets a threshold value table $\{t_k | k=1, 2, \ldots M\}$. This threshold value table serves to set a search range for the threshold values, and can be set based on a minimum value $x_{min}$ and a maximum value $x_{max}$ among the captured incident X-ray doses $x_i$ by the following equation.

[EQUATION 2]

$$t_k = \frac{k-1}{M-1}(x_{max} - x_{min}) + x_{min} \quad (2)$$

Where M is a parameter defining the search step, and an arbitrary value may be set as M.

Next, in step S302, the acquisition unit 112 initializes a variable $J_{min}$ in which a value of a least squares error is stored, and index ii and index jj which are indices for referring to the threshold value table t. In step S303, the acquisition unit 112 substitutes threshold values $t_{ii}$ and corresponding to the indices ii and jj for the threshold values $t_0$ and $t_1$, respectively.

Next, in step S304, the acquisition unit 112 calculates the unknown parameters a, b, and c under the threshold values $t_0$ and $t_1$ by the following equation according to the least squares criterion.

[EQUATION 3]

$$f(x) = \begin{cases} ax & x < t_0 \\ b(x-t_0)^2 + c(x-t_0) + at_0 & t_0 \leq x \leq t_1 \\ b(t_1-t_0)^2 + c(t_1-t_0) + at_0 & x > t_1 \end{cases} \quad (3)$$

A sum of squares of the residuals J for the sample data $\{(x_i, y_i) | i=1, 2, \ldots N \text{ and } x_i < x_{i+1}\}$ indicating the input/output characteristic is expressed by the following equation. Therefore, the parameters a, b, and c can be determined by acquiring parameters under which this J is minimized as the approximation parameters a, b, and c.

[EQUATION 4]

$$J = \sum_{i=1}^{N} (y_i - f(x_i))^2 \quad (4)$$

More specifically, the approximation parameters a, b, and c can be calculated by solving the following system of equations which set partial differentials of the parameters a, b, and c in the above equation (4) to 0.

[EQUATION 5]

$$\begin{cases} \dfrac{\partial J}{\partial a} = 0 \\ \dfrac{\partial J}{\partial b} = 0 \\ \dfrac{\partial J}{\partial c} = 0 \end{cases} \quad (5)$$

Next, in step S305, the acquisition unit 112 compares the sum of squares of the residuals J under the approximation parameters a, b, and c to $J_{min}$. If J is smaller than $J_{min}$ (YES in step S305), the processing proceeds to step S306 in which J is set to $J_{min}$, and the approximation parameters a, b, and c, and the threshold values $t_0$ and $t_1$ are substituted for A, B, C, $T_0$, and $T_1$, respectively, as the parameters of equation (1).

Next, the acquisition unit 112 updates the indices ii and jj by performing steps S307, S308, S309 to S310, and performs the above-described steps S303 to S306 for all values set in the threshold value table $t_k$. As a result, eventually, the parameters minimizing the sum of squares of the residues among the all combinations are stored in A, B, C, $T_0$, and $T_1$.

Next, in step S311, the acquisition unit 112 calculates the saturation level S based on the acquired parameters A, B, and C, and the threshold values $T_0$, and $T_1$. The saturation level S is an output value of the selected pixel when an incident X-ray dose exceeds $T_1$, and can be calculated by the following equation.

[Equation 6]

$$S = B(T_1-T_0)^2 + C(T_1-T_0) + AT_0 \quad (6)$$

Figure 3:
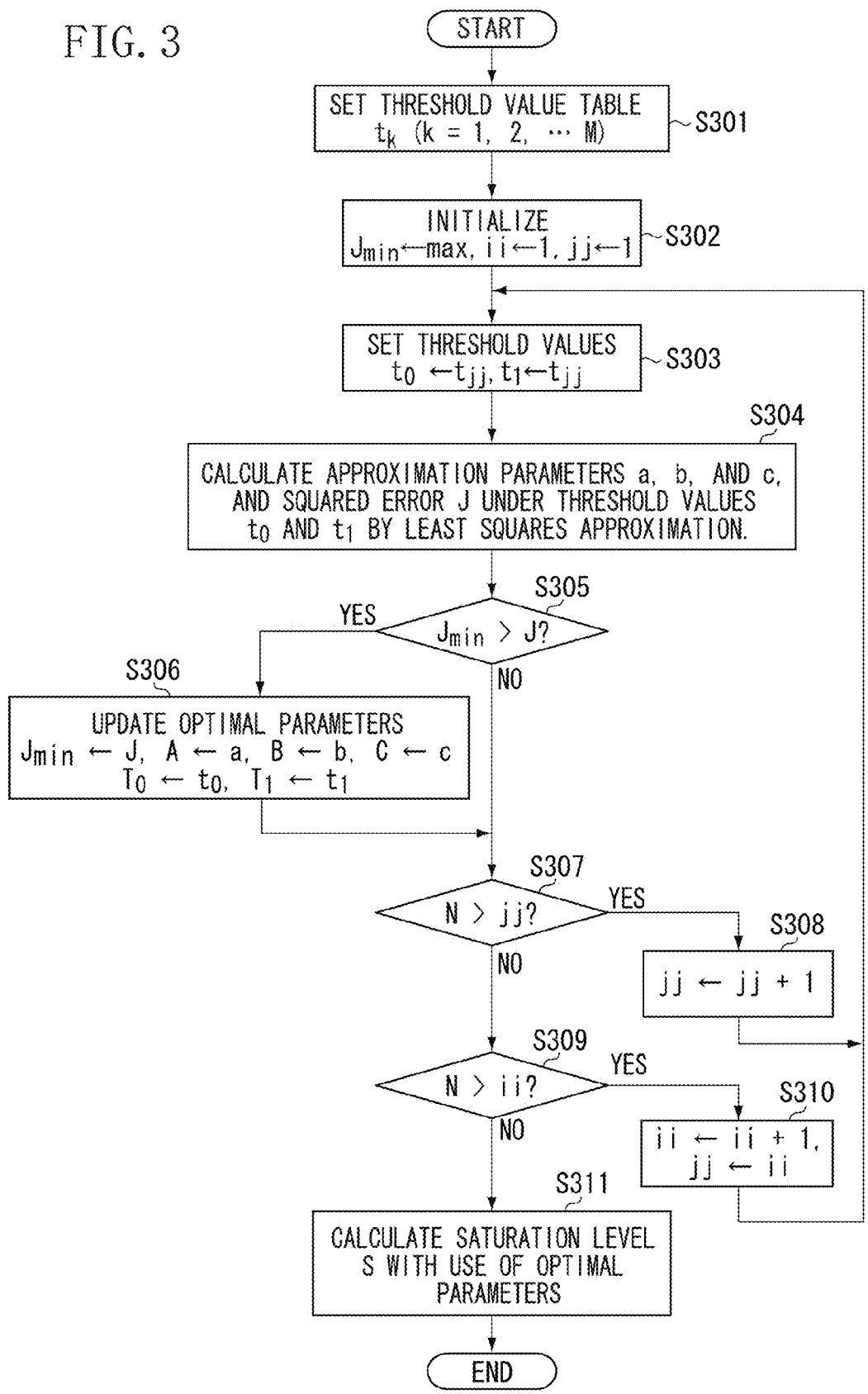
FIG. 3 is a flowchart illustrating a processing procedure of a model approximation according to the first exemplary embodiment.
Figure 9:
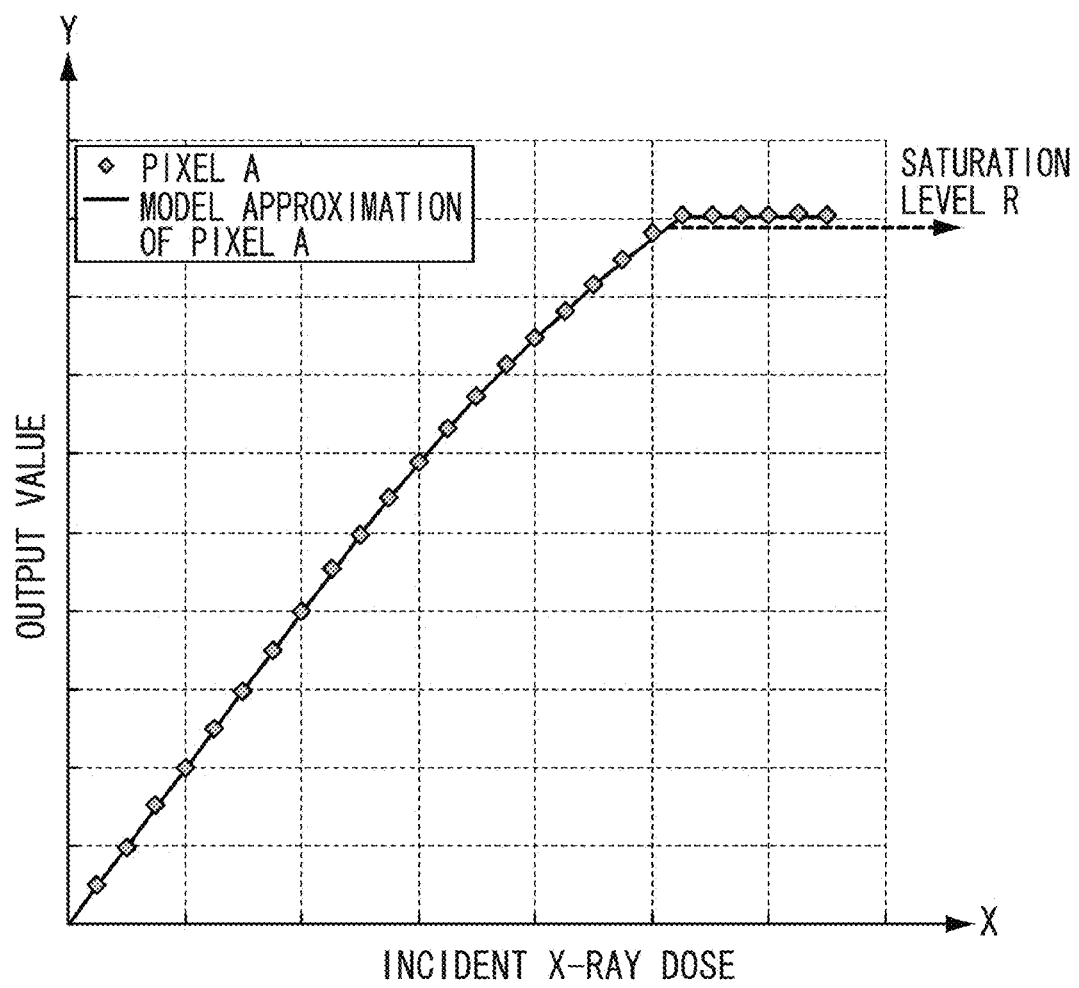
FIG. 9 illustrates a result of a calculation of the model approximation of the input/output characteristic and a saturation level.

In this manner, execution of the calibration operation according to the flowchart illustrated in FIG. 3 enables the model approximation with use of the parameters and the calculation of the saturation level S for one pixel, as illustrated in FIG. 9.

<Imaging Operation>

Figure 4:
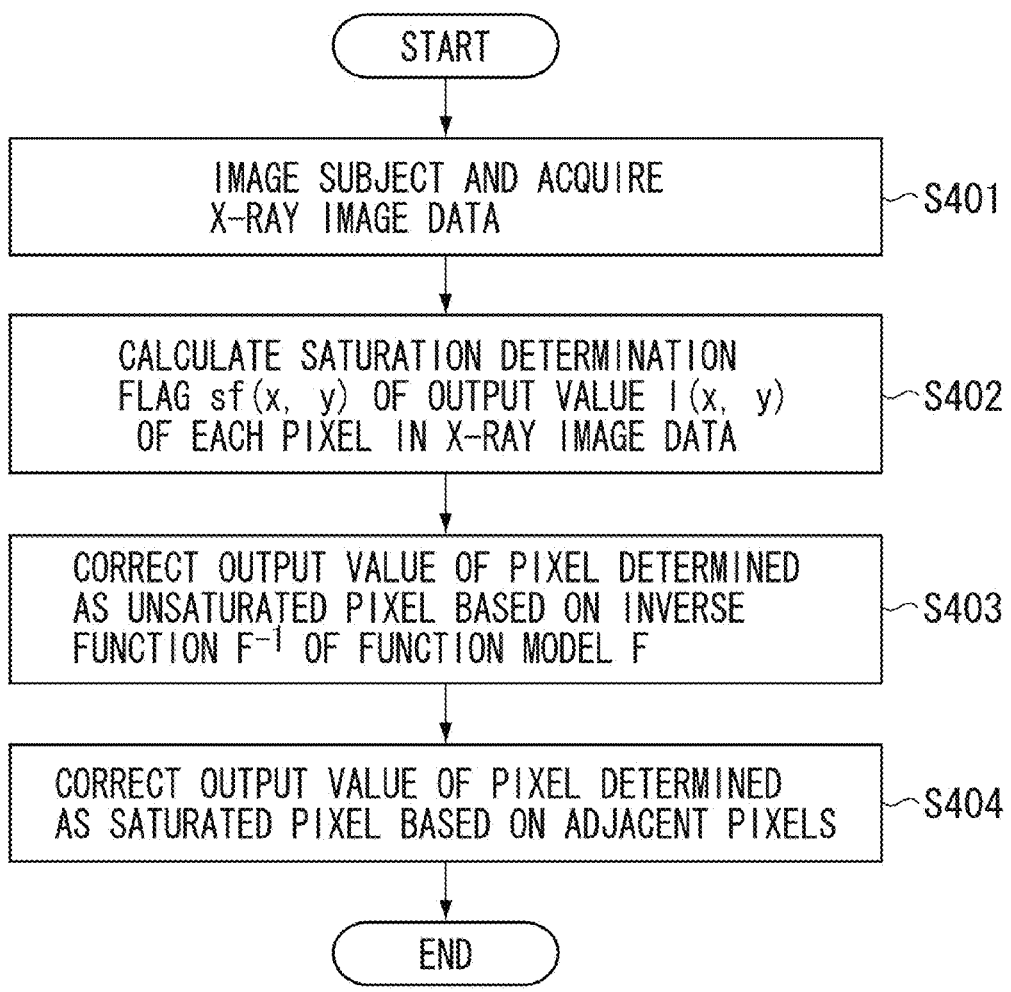
FIG. 4 is a flowchart illustrating a processing procedure of an imaging operation according to the first exemplary embodiment.

Next, the imaging operation according to the first exemplary embodiment will be described. The imaging operation performed by the X-ray imaging apparatus 100 illustrated in FIG. 1 will be specifically described with reference to the flowchart illustrated in FIG. 4. The imaging operation provides a preferable image after a variation in the input/output characteristics is corrected in a captured image of a subject based on the input/output characteristic and the saturation level for each pixel which is acquired by the above-described calibration operation.

First, an operator starts X-ray imaging after conducting positioning of a subject 103 so that the subject 103 is appropriately positioned relative to the X-ray detector 104, and sets imaging conditions through the operation panel 110. In the imaging operation, the X-ray generation unit 101 emits X-ray radiation in the form of an X-ray beam 102 according to the control of the CPU 108. The X-ray beam 102 passes through the subject 103 (or a region of interest thereof) while being attenuated, and reaches the X-ray detector 104. In step S401, this captured image data is first stored in the main memory 109 as X-ray image data after an offset variation therein is corrected as described above. In the present exemplary embodiment, the subject 103 is a human body. Therefore, the X-ray image data output from the X-ray detector 104 is an image of a human body.

Subsequently, in step S402, the determination unit 113 determines whether the output is saturated, and calculates a saturation determination flag "sf" for each pixel. In this case, the determination unit 113 sets the saturation flag sf=1 for a saturated pixel, and sets sf=0 to an unsaturated pixel by the following equation, based on a saturation level R(x, y) corresponding to an output value I(x, y) of each pixel in the captured X-ray image data.

[EQUATION 7]

$$sf(x, y) = \begin{cases} 1, & I(x, y) \geq kR(x, y) \\ 0, & I(x, y) < kR(x, y) \end{cases} \quad (7)$$

Where (x,y) are the pixel coordinates in the image capture unit, and k is a parameter for setting a margin (limit) to the saturation level R(x, y). A normalized value of 1 or less is set as k. Normally, an output value of a saturated pixel is a constant value, but variations often occurs either due to manufacturing errors, environmental influence (high temperature), efficiency decay, or the like. Therefore, k is empirically set in consideration of such variations. In the present exemplary embodiment, k is 0.95.

Next, in step S403, the first correction unit 114 calculates an image I' in which the input/output characteristic of each pixel is corrected. In this case, the first correction unit 114 corrects the characteristic of a pixel that is determined as an unsaturated pixel by the determination unit 113, i.e., a pixel with the setting of sf(x, y)=0. More specifically, an output value of each pixel is converted by an inverse function $F^{-1}$ of the function model F as the following equation, based on the parameters A(x, y), B(x, y), and C(x, y), and the threshold values $T_0(x, y)$ and $T_1(x, y)$ corresponding to the output value I(x, y) of each pixel with the setting of sf(x, y)=0. As a result, an output value of each pixel is corrected to a dose equivalent value unaffected by a variation of the input/output characteristic of the pixel. In other words, it is possible to calculate the corrected image I' in which the input/output characteristic of each pixel is corrected.

[EQUATION 8]

$$I'(x, y) = \begin{cases} F^{-1}(I(x, y)), & sf(x, y) = 0 \\ I(x, y) & sf(x, y) = 1 \end{cases} \quad (8)$$

$$F^{-1}(v) = \begin{cases} \dfrac{v}{A}, & v < AT_0 \\ T_0 - \dfrac{C}{2B} + \sqrt{\dfrac{v - AT_0}{B} + \dfrac{C^2}{4B^2}}, & v \geq AT_0 \text{ and } B > 0 \\ T_0 - \dfrac{C}{2B} + \sqrt{\dfrac{v - AT_0}{B} + \dfrac{C^2}{4B^2}}, & v \geq AT_0 \text{ and } B < 0 \end{cases}$$

This equation is not applied to a pixel determined as a saturated pixel, since such a pixel cannot be corrected by an inverse function. Therefore, a saturated pixel is corrected by a separate processing that is performed thereafter. Further, in the present exemplary embodiment, the inverse function is algebraically calculated, but the present exemplary embodiment is not limited thereto. The value may be analytically obtained with use of the direct search method (for example, the bisection method and the linear inverse interpolation method) and the successive approximation method (for example, the Newton-Raphson method and the Bailey method).

Next, in step S404, the second correction unit 115 calculates an image I" in which a pixel determined as a saturated pixel is corrected. In this case, the second correction unit 115 corrects a pixel determined as a saturated pixel by the determination unit 113, i.e., a pixel with the setting of sf(x, y)=1 with use of highly correlated adjacent pixels. More specifically, the second correction unit 115, upon receiving indication from the determination unit 113 that a saturated pixel exists, corrects the saturated pixel by performing a weighted summation of only pixels determined as unsaturated pixels, i.e., pixels with the setting of sf(x, y)=0 among pixels existing within a predetermined distance from the saturated pixel with the setting of sf(x, y)=1, as expressed by the following equation.

[EQUATION 9]

$$I''(x, y) \begin{cases} \dfrac{\sum_{\Delta x=-N}^{N} \sum_{\Delta y=-N}^{N} W(\Delta x, \Delta y) I'(x + \Delta x, y + \Delta y)}{\sum_{\Delta x=-N}^{N} \sum_{\Delta y=-N}^{N} W(\Delta x, \Delta y)(1 - x(x + \Delta x, y + \Delta y))}, & sf(x, y) = 1 \\ I'(x, y) & sf(x, y) = 0 \end{cases} \quad (9)$$

In equation (9) N represents a constant specifying a range of adjacent pixels to be included in the weighted summation. In the present exemplary embodiment, for example, N is 2. Specifically, the predetermined distance can be calculated by multiplying N by the size of a pixel. Further, W represents a function setting a weight coefficient for weighting each of the adjacent pixels. In the present exemplary embodiment, this function system for weighting can be implemented by, for example, a Gauss function as indicated by the following equation, although the function system is not especially limited thereto.

[EQUATION 10]

$$W(\Delta x, \Delta y) = \exp\left(-\dfrac{\Delta x^2}{2\sigma^2} - \dfrac{\Delta y^2}{2\sigma^2}\right) \quad (10)$$

Where σ represents a standard deviation of the Gauss function. In the present exemplary embodiment, for example, σ is N.

In this manner, according to the first exemplary embodiment, it is possible to appropriately correct a variation in the input/output characteristics of the respective pixels even if there is a saturated pixel, by calculating the saturation level and switching the correction method based on whether the pixel is saturated.

The accuracy can be further improved by resetting and calculating the margin k in EQUATION (7) when calculating EQUATION (9). More specifically, the margin k is set so as to monotonically decrease according to the distance from a saturated pixel with the setting of sf(x, y)=1. This arrangement increases the contribution of an output of a pixel highly correlated to the saturated pixel, and conversely, reduces the contribution an output of a pixel less correlated to the saturated pixel. In other words, setting a larger value as the margin k increases the possibility of being affected by the saturation level. However, despite this possibility, the margin k is set so that an output of a pixel highly correlated to the saturated pixel becomes more contributive. It should be noted that depending on the location of the saturated pixel, adjacent unsaturated pixels to be included in the weighted summation may be selected one-dimensionally, for example, along the row or column direction, or may be selected two-dimensionally to include all unsaturated pixels in the row and column directions immediately surrounding the unsaturated pixel.

Figure 5:
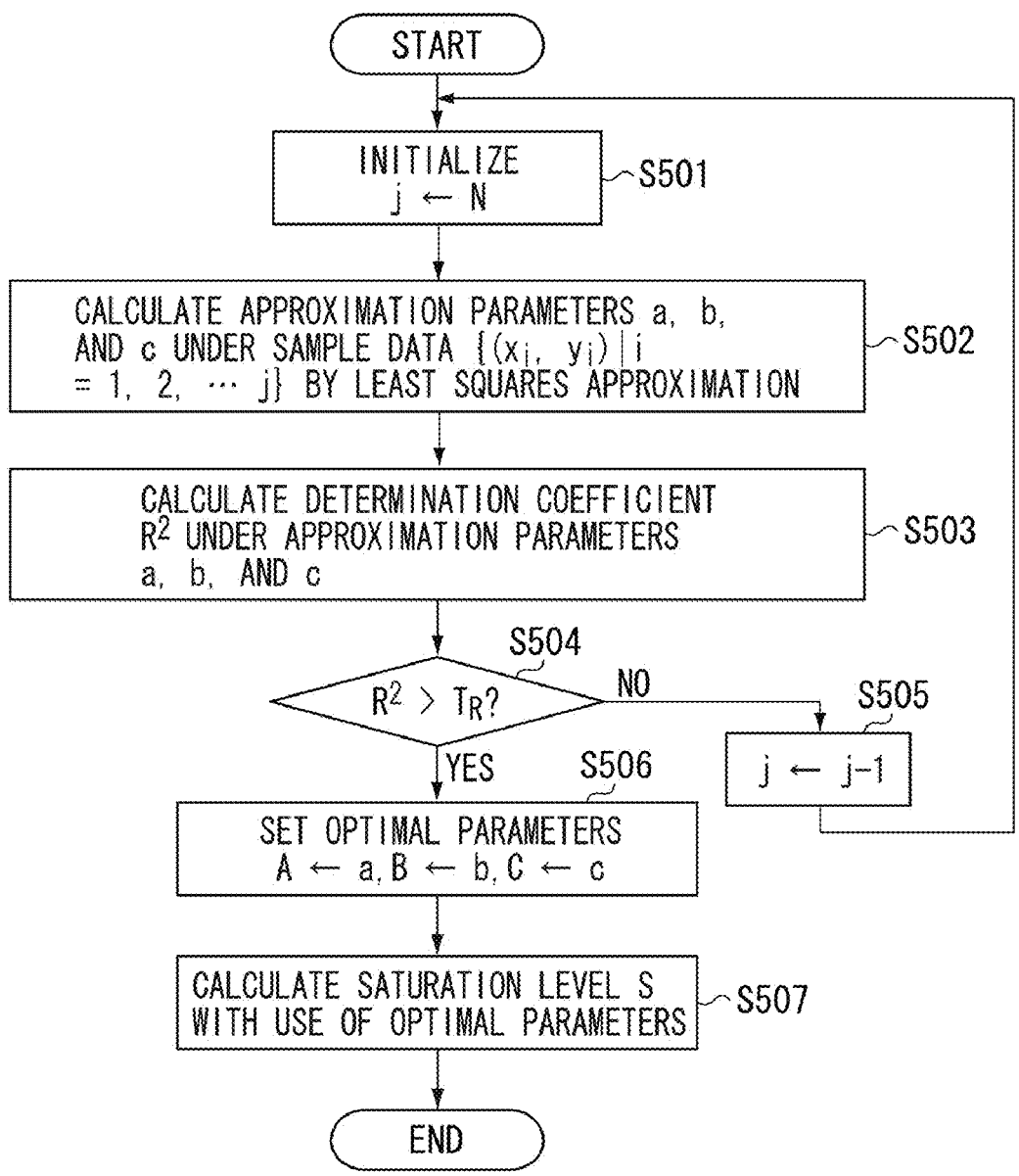
FIG. 5 is a flowchart illustrating a processing procedure of a model approximation according to a second exemplary embodiment.

A second exemplary embodiment will be now described. FIG. 5 is a flowchart illustrating a processing procedure of a model approximation according to the second exemplary embodiment.

In the present exemplary embodiment, the X-ray imaging apparatus 100 employs, as the model approximation method in the calibration operation, a method according to the flowchart illustrated in FIG. 5 which is different from the first exemplary embodiment. The processing procedure of the overall calibration operation is the same as the above-described processing illustrated in FIG. 2, and therefore repetitive description thereof will be omitted. In the following, only differences from the above-described first exemplary embodiment will be described specifically.

The second exemplary embodiment carries out the calibration operation as follows. First, in the calibration operation, in step S201, the acquisition unit 112 acquires X-ray image data and incident X-ray dose data, as described above. Then, in steps S202 to S204, the acquisition unit 112 acquires the incident X-ray doses $\{x_i | i=1, 2 \ldots N \text{ and } x_i < x_{i+1}\}$ and the output values $\{y_i | i=1, 2 \ldots N\}$ of a pixel corresponding to $x_i$ as the sample data of the input/output characteristic for each pixel, and calculates the parameters in the approximation by the function model F and the saturation level S.

The present exemplary embodiment uses, for example, a quadratic function as indicated by the following equation as the function model F.

[Equation 11]

$$f(x) = Ax^2 + Bx + C \quad (11)$$

Figure 10:
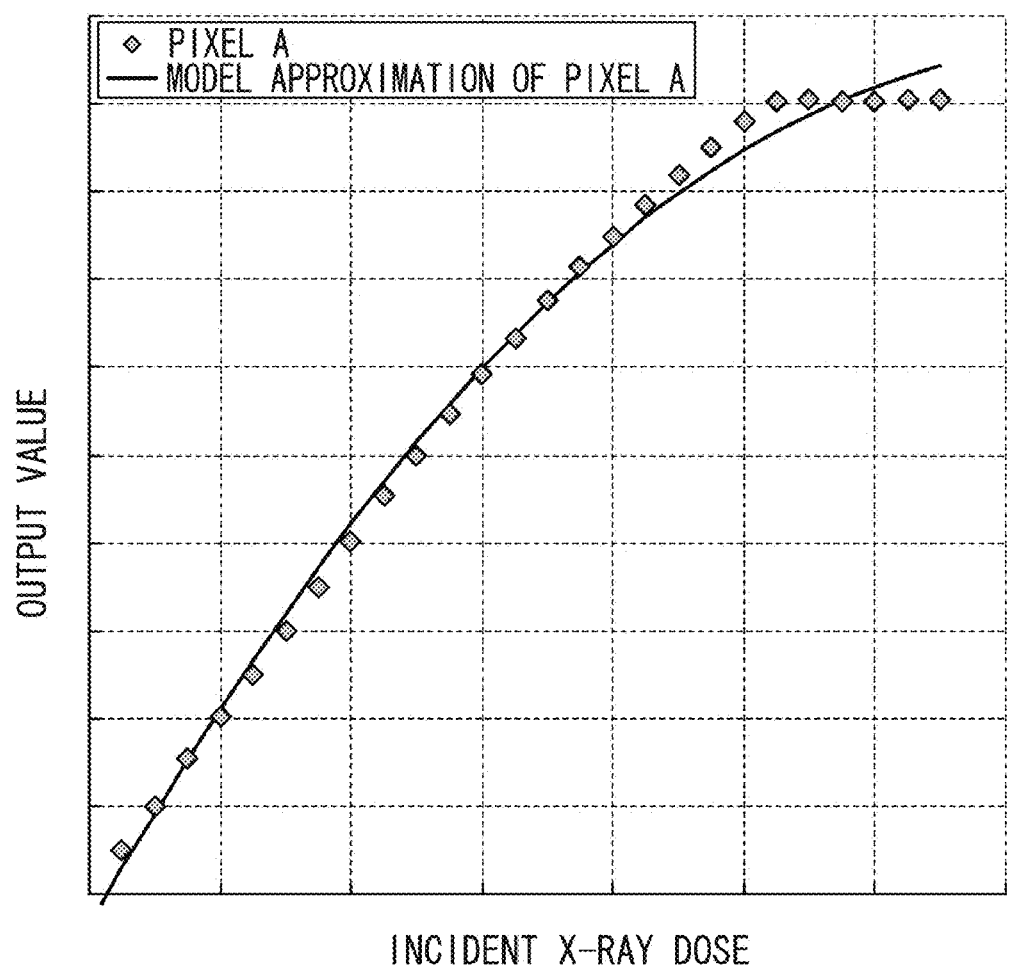
FIG. 10 illustrates the model approximation according to a difference in the number of samples.

This equation is a function model designed in consideration of up to the dose region where the input/output characteristic is nonlinear, but not designed in consideration of the dose region that reaches the saturation level. Therefore, as illustrated in FIG. 10, inclusion of sample data that exceeds the saturation level lowers the approximation accuracy. Therefore, the parameters and the saturation level are calculated by performing a model approximation while reducing the number of data pieces by removing data one by one, starting from the data of the highest dose in descending order in the acquired sample data. This calculation method will be described more specifically with reference to the flowchart illustrated in FIG. 5.

First, in step S501, the acquisition unit 112 substitutes N (the number of sample collected) into an index j for referring to the sample data. Then, in step S502, the acquisition unit 112 calculates the unknown parameters a, b, and c under the sample data $\{(x_i, y_i)|i=1, 2, \ldots j \text{ and } x_i < x_{i+1}\}$ according to the least squares criterion by the following equation.

[Equation 12]

$$f(x) = ax^2 + bx + c \qquad (12)$$

A sum of squares of the residuals J of the sample data $\{(x_i, y_i)|i=1, 2, \ldots j \text{ and } x_i < x_{i+1}\}$ indicating the input/output characteristic is expressed by the following equation (13). Therefore, the approximation parameters a, b, and c can be determined by acquiring parameters at which this J is minimized, i.e., by solving the system of equations which set partial differentials of the parameters a, b, and c to 0.

[EQUATION 13]

$$J = \sum_{i=1}^{j} (y_i - f(x_i))^2 \qquad (13)$$

Next, the acquisition unit 112 calculates a coefficient of determination $R^2$ expressed by the following equation (14), as an index value indicating the approximation accuracy under the acquired approximation parameters.

[EQUATION 14]

$$R^2 = 1 - \frac{J}{\sum_{i=1}^{j}(y_i - \overline{y})^2}, \quad \overline{y} = \frac{1}{j}\sum_{i=1}^{j} y_i \qquad (14)$$

The coefficient of determination $R^2$ is a value from 0 to 1, and an $R^2$ closer to 1 indicates high approximation accuracy. Although the present exemplary embodiment uses the coefficient of determination $R^2$ as the index value of approximation accuracy, the present exemplary embodiment is not limited thereto. For example, the index value may be implemented by a coefficient of determination adjusted for degrees of freedom.

Next, in step S504, the acquisition unit 112 compares the calculated coefficient of determination $R^2$ with an arbitrary threshold value $T_R$. If the coefficient of determination $R^2$ is smaller than the threshold value $T_R$, i.e., the approximation accuracy does not satisfy a desired level of accuracy (No in step S504), in step S505, the acquisition unit 112 decrements j. The acquisition unit 112 repeatedly performs steps S502 and S503 until the approximation accuracy satisfies the desired level of accuracy. In other words, the acquisition unit 112 repeatedly performs steps S502 and S503 while checking a change in the approximation error. The threshold value $T_R$ may be determined according to a desired level of approximation accuracy. In the present exemplary embodiment, for example, 0.9995 is set as the threshold value $T_R$.

Figure 11:
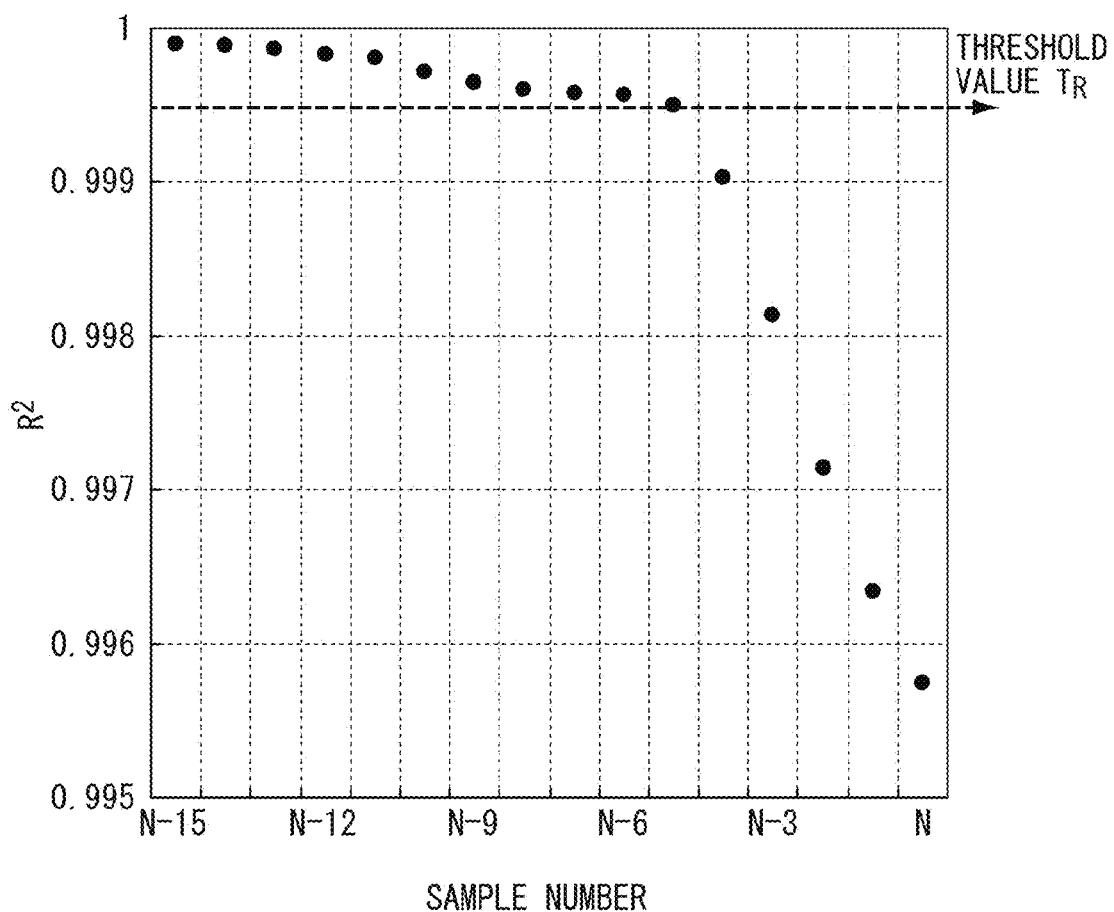
FIG. 11 illustrates approximation accuracy according to the difference in the number of samples.
Figure 12:
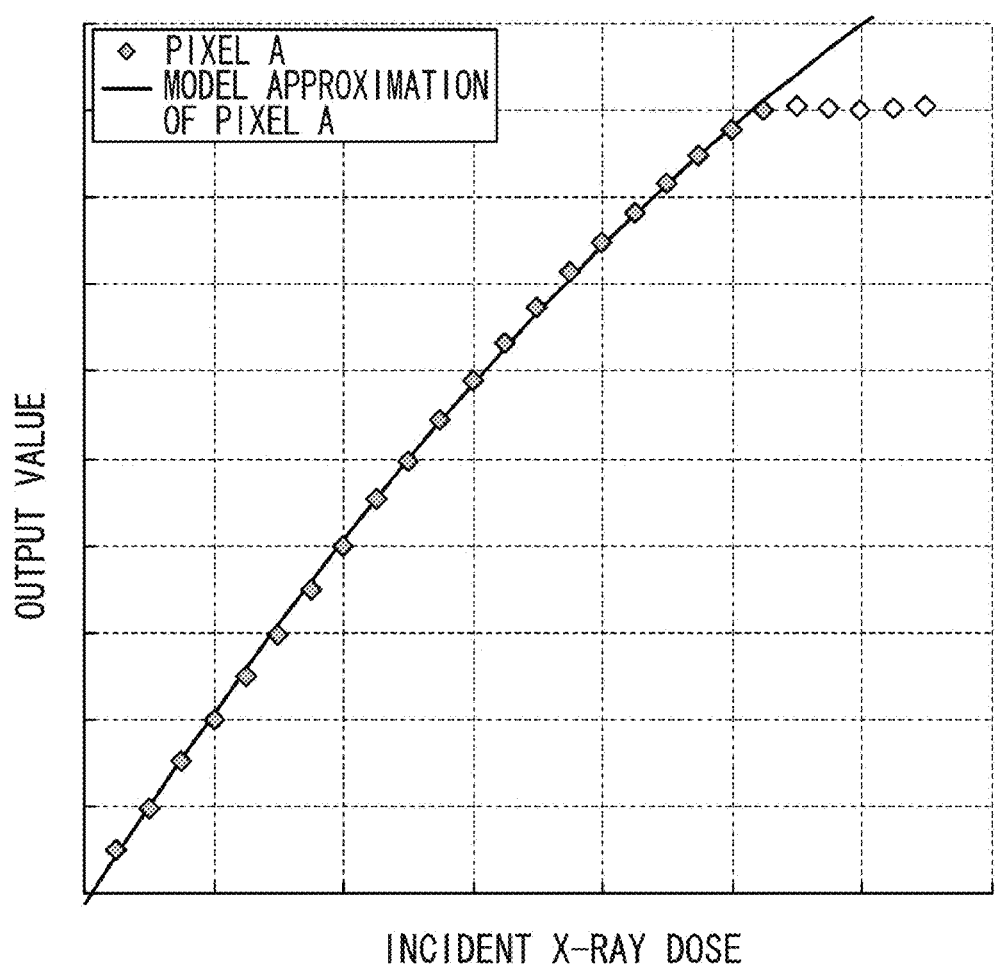
FIG. 12 illustrates the model approximation according to the difference of the number of samples.

Repeated execution of steps S502 and S503 means performing a model approximation while reducing the number of data pieces by removing data one by one, starting from the data of the highest dose in descending order in the acquired sample data. As a result, even if the sample data includes a data piece that exceeds the saturation level, it is possible to exclude this data to acquire parameters that yield high approximation accuracy. FIG. 11 illustrates the coefficient of determination $R^2$ when the model approximation is performed with respect to the sample data having the same input/output characteristic as that illustrated in FIG. 10 while reducing the number of data pieces. As illustrated in FIG. 11, exclusion of the sample data that exceeds the saturation level can increase the coefficient of determination $R^2$. Further, FIG. 12 illustrates a result of the approximation under the condition that the number of samples is (N−5), which is the largest among those with the coefficient of determination $R^2$ that exceeds the threshold value $T_R$ in FIG. 11, and reveals that the dose region that does not reach the saturation level can be accurately approximated to a quasi linear function, compared to the approximation result illustrated in FIG. 10.

Next, when the coefficient of determination $R^2$ becomes larger than the threshold value $T_R$, i.e., the approximation accuracy satisfies the desired level of accuracy (YES in step S504), in step S506, the acquisition unit 112 substitutes the acquired approximation parameters a, b, and c for A, B, and C, as the parameters.

Then, in step S507, the acquisition unit 112 calculates the saturation level S based on the acquired parameters A, B, and C. The saturation level S is an output value of a pixel when an incident X-ray dose exceeds the incident X-ray dose $x_j$ that allows a model approximation, and can be calculated by the following equation.

[Equation 15]

$$S = Ax_j + Bx_j + C \qquad (15)$$

In this manner, according to the second exemplary embodiment, it is possible to perform a model approximation with use of the parameters, and calculate the saturation level S for each pixel, even if sample data includes certain data that reaches the saturation level.

Figure 6:
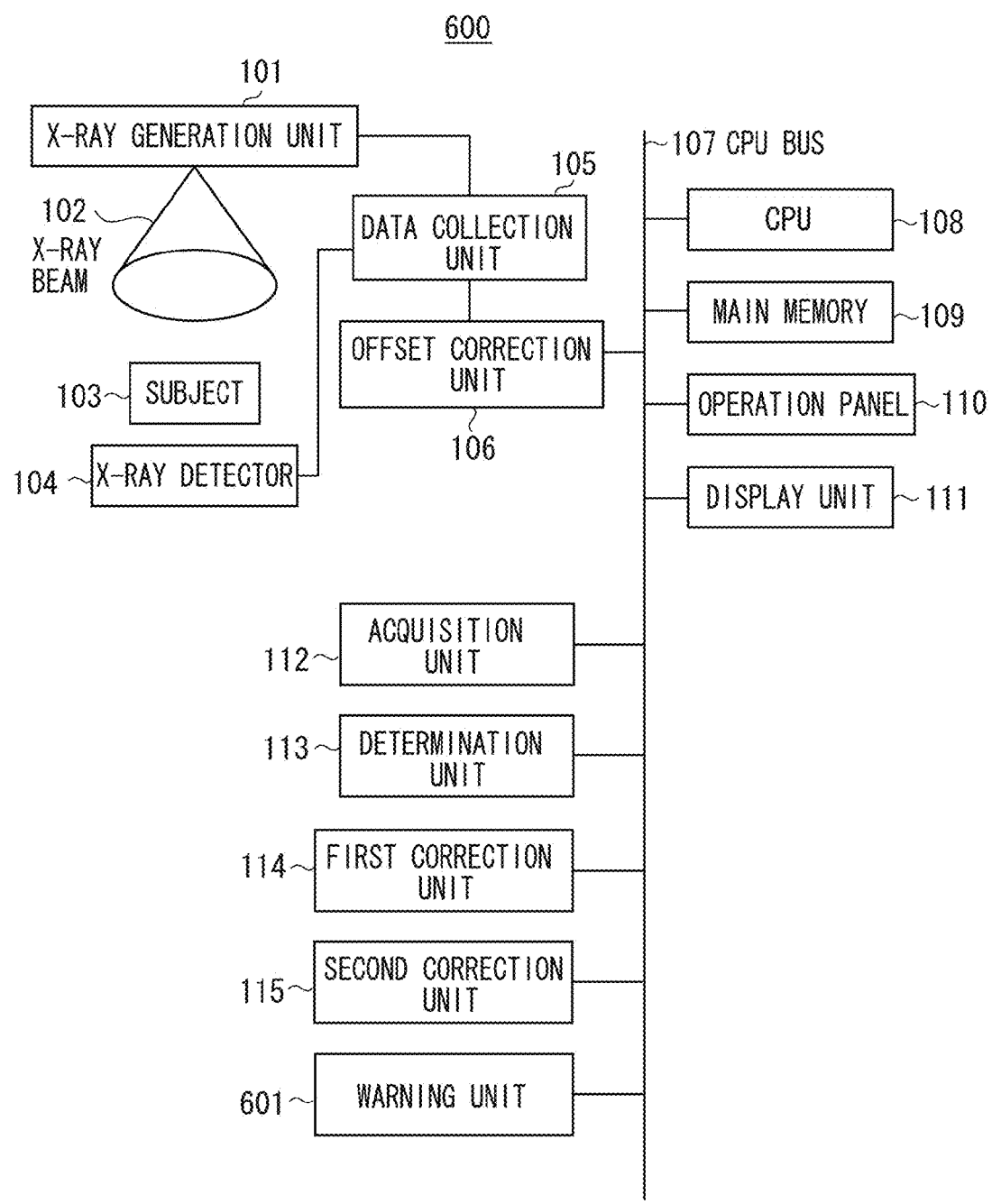
FIG. 6 illustrates an overall configuration of an X-ray imaging apparatus according to a third exemplary embodiment.

A third exemplary embodiment will be now described. FIG. 6 illustrates a configuration of an entire X-ray imaging apparatus according to the present exemplary embodiment.

Figure 7:
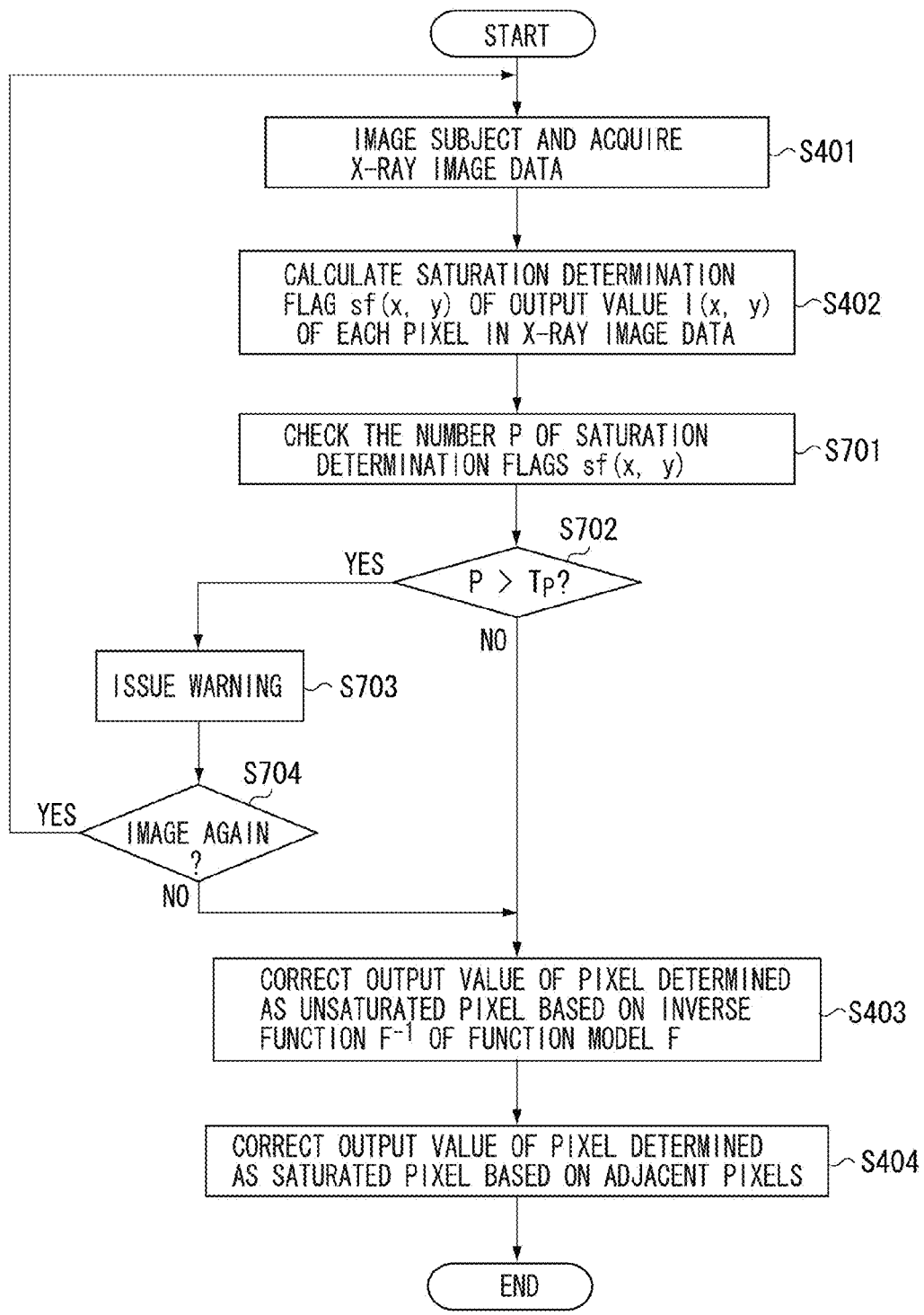
FIG. 7 is a flowchart illustrating a processing procedure of an imaging operation according to the third exemplary embodiment.

FIG. 7 is a flowchart illustrating a processing procedure of an imaging operation according to the present exemplary embodiment.

The present exemplary embodiment is applied to, for example, an X-ray imaging apparatus 600 as illustrated in FIG. 6. Compared to the configuration of the X-ray imaging apparatus 100, the X-ray imaging apparatus 600 additionally includes a warning unit 601. Further, in the present exemplary embodiment, the processing procedure of the imaging operation is an operation according to the flowchart illustrated in FIG. 7, which is different from the first exemplary embodiment.

In the following, the X-ray imaging apparatus 600 illustrated in FIG. 6 will be described, assigning the same reference numerals as those in the X-ray imaging apparatus 100 illustrated in FIG. 1 to the units that function in the same manners as those in the X-ray imaging apparatus 100, and omitting the detailed descriptions thereof. Further, the flowchart illustrated in FIG. 7 will be described, assigning the same step numbers as those in the flowchart illustrated in FIG. 4 to the steps that are carried out in the same manners as those in the flowchart illustrated in FIG. 4, and providing specific descriptions here only about different configurations from the above-described first exemplary embodiment.

The imaging operation according to the third exemplary embodiment will be now described. First, as described above, in the imaging operation, the saturation determination flag sf is calculated for each pixel from captured X-ray image data by carrying out steps S401 and S402.

Then, in step S701, the warning unit 601 counts the number of pixels determined as saturated pixels, i.e., pixels with the setting of sf(x, y)=1 based on the saturation determination flag sf, and sets the total number to P.

Next, in step S702, the warning unit 601 compares the total number P with a threshold value $T_p$. If the total number P is smaller than the threshold value $T_p$ (NO in step S702), a variation in the input/output characteristics of the individual pixels is corrected by carrying out steps S403 and S404.

On the other hand, if the total number P is larger than the threshold value $T_p$ (YES in step S702), i.e., if there are a large number of saturated pixels, this means that the imaging dose is excessive so that an appropriate correction may be impossible. Therefore, in step S703, the warning unit 601 warns an operator of this situation through the display unit 111. Further, the warning unit 601 displays information regarding the saturated pixels together with the warning. The method for displaying the information regarding the saturated pixels is not especially limited. For example, coordinates of the saturated pixels may be displayed, or the X-ray image data itself may be displayed. Alternatively, bright colors (e.g. red) may be added to only the saturated pixels when the X-ray image data is displayed.

Next, the operator confirms the displayed information, and selects whether to reshoot the image through the operation panel 110. In this case, if the operator selects reshooting (YES in step S704), the processing returns to step S401, and the imaging operation is repeated. On the other hand, if the operator selects not reshooting, steps S403 and 404 are carried out to correct a variation in the input/output characteristics of the each pixel.

The above-described threshold value $T_p$ can be determined according to the acceptable number of saturated pixels. For example, in the present exemplary embodiment, 0.01% of the total number of pixels is set as the threshold value $T_p$. Further, the present exemplary embodiment is configured in such a manner that a warning is issued to an operator according to the number P of all of the saturated pixels, but the present exemplary embodiment is not limited thereto. For example, the present exemplary embodiment may be configured to analytically detect a region where an X-ray directly reaches the detector (also called as "through region"), and count the number P of the saturated pixels within the range not including this region. Further, a warning may be issued to an operator, only when the second correction unit 115 cannot correct the saturated pixels, i.e., there is no unsaturated pixel in the vicinity of a pixel determined as a saturated pixel.

In this manner, according to the third exemplary embodiment, it is possible to display a warning when an imaging dose is excessive so that an appropriate correction may be impossible, to distinctly notify an operator of this situation.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-166137 filed Jul. 23, 2010, which is hereby incorporated by reference herein in its entirety.

What is claimed is:

1. An X-ray imaging apparatus comprising:
an image capture unit including a plurality of pixels for detecting X-ray radiation;
a first correction unit configured to correct an output value of a unsaturated pixel among the plurality of pixels; and
a second correction unit configured to correct an output value of a saturated pixel among the plurality of pixels,
wherein the second correction unit corrects the saturated pixel based on an output value of the unsaturated pixel corrected by the first correction unit and located within a predetermined distance from the saturated pixel.

2. The X-ray imaging apparatus according to claim 1, further comprising:
an acquisition unit configured to acquire a saturation level for each of the plurality of pixels, and to apply a model approximation to a relationship between an incident X-ray dose and an output value for each pixel for use in the first correction unit to correct the output value of the unsaturated pixel with a pixel value at which the output value starts to be saturated.

3. The X-ray imaging apparatus according to claim 2, wherein the model approximation comprises acquisition of the input/output characteristic and the pixel value at which the output value starts to be saturated, based on a change in an approximation error during a reduction in the number of data pieces, starting from data of a highest X-ray dose in descending order, in data indicating the relationship between the incident X-ray dose and the output value of each pixel.

4. The X-ray imaging apparatus according to claim 1, wherein the second correction unit performs a weighted summation of the output value of the unsaturated pixel corrected by the first correction unit and existing within the predetermined distance from the saturated pixel.

5. The X-ray imaging apparatus according to claim 1, wherein the first correction unit corrects the output value of the unsaturated pixel such that the output value of each pixel has a linear relationship with an incident X-ray dose.

6. The X-ray imaging apparatus according to claim 1, wherein the first correction unit corrects the output value of the unsaturated pixel such that an input/output characteristic of each pixel approaches a reference input/output characteristic.

7. The X-ray imaging apparatus according to claim 1, further comprising a warning unit configured to issue a warning when a number of saturated pixels among the plurality of pixels exceeds a predetermined number.

8. A method of correcting pixels in an X-ray image capture unit, comprising:
   irradiating the X-ray image capture unit with X-ray radiation;
   performing a first correction operation to correct an output value of an unsaturated pixel among the plurality of pixels; and
   performing a second correction operation to correct an output value of a saturated pixel among the plurality of pixels,
   wherein the second correction operation corrects the output value of the saturated pixel based on an output value of the unsaturated pixel corrected by the first correction operation and located within a predetermined distance from the saturated pixel.

9. A computer-readable storage medium for storing a program that can cause a computer to execute the X-ray imaging method according to claim 8.

* * * * *